United States Patent [19]

Susini et al.

[11] Patent Number: 4,869,458
[45] Date of Patent: Sep. 26, 1989

[54] LIQUID DISTRIBUTION VALVE

[75] Inventors: Etienne Susini, Villecresnes, France; Pierrre Soubrier, Brussels, Belgium

[73] Assignee: Baxter International Inc., Deerfield, Ill.

[21] Appl. No.: 155,928
[22] PCT Filed: May 20, 1987
[86] PCT No.: PCT/FR87/00173
    § 371 Date: Mar. 2, 1988
    § 102(e) Date: Mar. 2, 1988
[87] PCT Pub. No.: WO87/07352
    PCT Pub. Date: Dec. 3, 1987

[30] Foreign Application Priority Data
May 21, 1986 [FR] France ............... 86 07209

[51] Int. Cl.⁴ .......................... F16K 31/143
[52] U.S. Cl. ................... 251/14; 91/167 R;
    92/62; 251/63.5; 251/63.6; 251/249.5
[58] Field of Search ......... 251/14, 31, 62, 63.5,
    251/63.6, 249.5; 91/167 R; 92/13.6, 62, 75

[56] References Cited

U.S. PATENT DOCUMENTS

| | | |
|---|---|---|
| 2,869,299 | 1/1959 | Jarund . |
| 3,149,537 | 9/1964 | Fink ............... 92/62 |
| 3,155,365 | 11/1964 | Hartung et al. ............... 251/62 |
| 3,209,737 | 10/1965 | Omotehera et al. ............... 92/62 |
| 3,269,079 | 8/1966 | Schmied . |
| 3,288,036 | 11/1966 | Fisher ............... 92/62 |
| 3,312,146 | 4/1967 | Quere et al. ............... 92/62 |
| 3,349,859 | 10/1967 | Cox et al. . |
| 3,381,441 | 5/1968 | Condo et al. . |
| 3,491,503 | 1/1970 | Ashton et al. . |
| 3,517,688 | 6/1970 | Scholle ............... 251/63.6 |
| 3,526,079 | 9/1970 | Maxeiner et al. . |
| 3,543,342 | 12/1970 | Moran et al. . |
| 3,566,575 | 3/1971 | Lisiecki . |
| 3,672,628 | 6/1972 | Aanstad ............... 251/63.6 |
| 3,687,017 | 8/1972 | Lewis et al. ............... 251/63.6 |
| 3,719,041 | 3/1973 | Barnard et al. ............... 92/62 |
| 3,813,845 | 6/1974 | Wiekert . |
| 3,831,821 | 8/1974 | Doyen . |
| 3,911,790 | 10/1975 | Gaitten . |
| 3,941,306 | 3/1976 | Weikert . |
| 4,096,881 | 6/1978 | Schabert et al. ............... 251/62 |
| 4,186,649 | 2/1980 | Sundstrom ............... 92/62 |
| 4,208,852 | 6/1980 | Pioch . |
| 4,341,054 | 7/1982 | Courtheoux . |
| 4,341,329 | 7/1982 | Kuemmerer et al. . |
| 4,509,313 | 4/1985 | Koppe . |
| 4,524,563 | 6/1985 | Sassi . |
| 4,593,730 | 6/1986 | Reil et al. . |
| 4,617,779 | 10/1986 | Nygren et al. . |

FOREIGN PATENT DOCUMENTS

| | | |
|---|---|---|
| 1600749 | 1/1970 | Fed. Rep. of Germany . |
| 1248011 | 10/1959 | France . |
| 1263280 | 4/1960 | France . |
| 1260233 | 12/1961 | France ............... 92/62 |
| 2127055 | 10/1972 | France . |
| 2371209 | 11/1976 | France . |
| 2425566 | 5/1979 | France . |
| 47-14542 | 5/1972 | Japan ............... 251/14 |
| 1594268 | 7/1981 | United Kingdom . |
| 1602644 | 11/1981 | United Kingdom . |
| 2086311 | 5/1982 | United Kingdom . |

Primary Examiner—George L. Walton
Attorney, Agent, or Firm—Paul E. Schaafsma; Paul C. Flattery; Robert M. Barrett

[57] ABSTRACT

An apparatus for feeding a liquid from a reservoir is provided. A distribution duct that defines a channel extending from the reservoir is provided that is in fluid communication with a feeding duct that defines a channel. A valve seat is located between the distribution duct and the feeding duct. The channels defined by the distribution and feeding duct extend in the same plane at the valve seat. The valve seat is located at an acute angle with respect to that plane. A closing device, for regulating fluid flow from the distribution duct to the feeding duct is provided. The closing device includes a movable valve, movable in a direction that is at an acute angle to the flow if the fluid from the distribution duct to the feeding duct, for mating with the valve seat. A member is coupled to the valve for urging the valve toward the valve seat. Members are provided for adjusting the member for causing the closing device to move.

20 Claims, 3 Drawing Sheets

LIQUID DISTRIBUTION VALVE

BACKGROUND OF THE INVENTION

The present invention relates to a valve for the distribution of a liquid. The invention specifically relates, although not exclusively so, to the filling of perfusion pouches or bags.

There are known machines for the manufacture of pouches or bags from a flexible film made from plastic material. More specifically, there are known machines for the manufacture of pouches or bags from a thermoplastic film. These machines include a series of stations at which the film is treated in succession. Generally, the film is unwound from a winder, then it is perforated Perpendicular to the perforation, ports or fitments are heat sealed by a welding head, the film is then shaped in a shaping device designed to fold the film back on itself in order to create an edge to edge seal. The film that has been sealed edge to edge forms a tube that is then heat sealed in the transverse direction at regular intervals to form individual pouches or bags. These individual pouches or bags are filled prior to the creation of the second transverse heat seal that forms the pouch or bag.

The present invention more specifically relates to a distribution valve for the liquid that fills the pouch or bag. In this respect, it will be noted that the pouch generally is filled from a constant level tank, or by a feeding circuit under constant pressure. The filling of the pouch or bag itself is done over a constant period of time, independent of the quantity of liquid to be introduced into the pouch or bag. Under those conditions, the final quantity of liquid contained in the pouch or bag depends on the opening section of the distribution valve.

There are known devices that have members that none in steps to permit the filling of pouches that may contain different quantities of liquid. Such existing devices, however, do not permit an adjustment of all of the movable members in order to adapt the entire valve to a particular liquid, to example, a liquid having a given viscosity.

SUMMARY OF THE INVENTION

The present invention provides a valve for the distribution of a liquid that permits a very rapid modification of the quantity of product distributed during the time the valve is open, while maintaining precise control over the quantity of product distributed.

To this end there is provided, according to the invention, a vlave for the distribution of a liquid having a valve body with a feeding duct, a distribution duct, a seal between the feeding duct and the distribution duct, a closing device mounted in a movable manner facing the seat, and means for governing the closing device in order, to position the closing device relative to the seat. This means for governing the closing device has a means movable in steps connected to the closing device by a common connecting rod. The distribution valve further includes a means for adjusting the assembly of movable means relative to the valve body.

Thus, in order to globally adjust the opening that corresponds to each one of the steps, it is sufficient to perform a single adjustment without a need to uncouple the valve.

In a preferred embodiment, the valve having means movable in steps in assembled in a governing casing associated with the valve body, the adjusting means includes a screwnut connected to the valve body to rotate relative to the body, an external thread on part of the governing casing arranged coaxially to a connecting rod and held in a screwnut, and a means to prevent the governing casing from rotating with the screwnut. Thus, the rotation of the screwnut causes a displacement of the entire casing, and a displacement of the means movable in step in a direction parallel to the connecting rod causing a modification of the valve opening.

In a preferred embodiment of the invention, the latter includes means for closing the valve in the absence of governing fluid. Specifically, the means for closing the valve in the absence of governing fluid includes a maximum opening piston associated with the common connecting rod, a spring acting on the piston in the direction closing the valve, and an opening chamber in connection with a face of the maximum opening piston opposed to the action of the spring. The opening chamber has an opening for the feeding of the governing fluid. Thus, in the absence of governing fluid, the valve is maintained completely closed by the spring.

In a preferred embodiment of the invention, the means movable in steps comprises means of maximum opening means associated with the common connecting rod, partial opening pistons attached to rods that are separated from one another and assembled in a series inside a governing casing which has, for each partial opening piston, an intake opening for the admission of governing fluid and a lug piece for the end of the run in the direction of closing. The run of each piston increases from the partial opening piston which is most remote from the common connecting rod.

Thus, in order to obtain a desired valve opening, it is sufficient to send governing fluid to the intake opening of the partial opening piston that corresponds to the desired valve opening.

In a preferred embodiment, the end-of-run lug pieces and the partial opening pistons are movable. Therefore, when it is desired to modify the quantity of product associated with a given step, it is sufficient to replace the end-of-run lug piece of the corresponding piston with the end-of-run lug piece corresponding to the desired run of the partial opening piston. This run determines the degree of opening of the valve.

In another preferred embodiment of the invention, the maximum opening piston has an effective section smaller than the partial opening pistons. Thus, when using the same governing fluid for the opening chamber and the intake opening which is associated with the partial opening pistons, an equilibrium of the device is obtained that solely depends on the partial opening piston which is subjected to the governing fluid.

Other features and advantages of the present invention will be apparent from the detailed description of the presently preferred embodiments and the drawings.

DETAILED DESCRIPTION OF THE PRESENTLY PREFERRED EMBODIMENT

Figure 1:
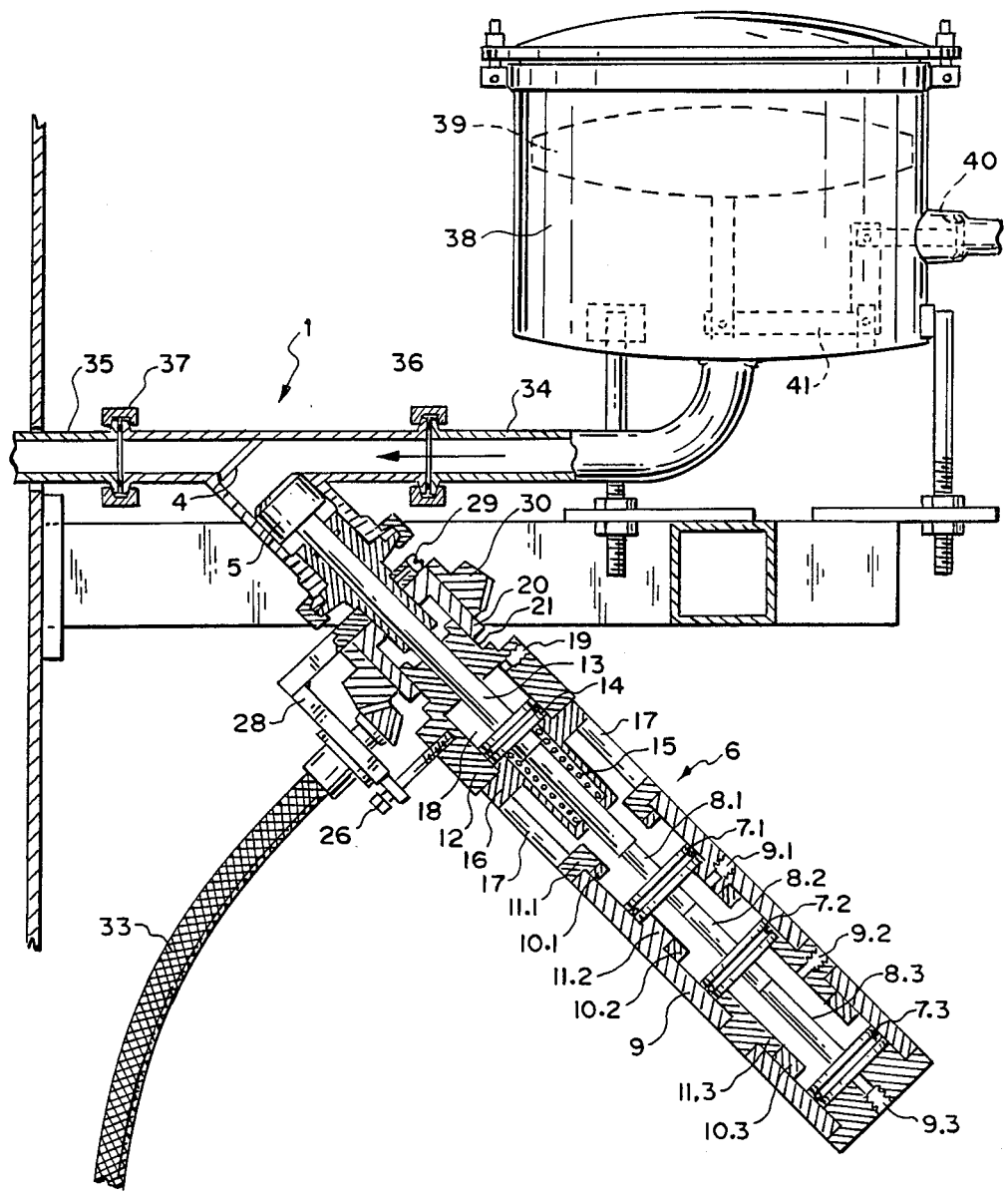
FIG. 1 is an elevated cross-sectional view of a liquid distribution device including a distribution valve according to the present invention.

Referring now to the Figures, the valve for the distribution of a liquid according to the present invention includes a valve body 1, having a feeding duct 2, a distribution duct 3, and a seat 4 located between the feeding duct 2 and the distribution duct 3. A closing device is mounted in a movable manner facing the valve seat 4. Furthermore, the valve includes a closing device governing means 6 having partial opening pistons 7.1, 7.2, 7.3 attached to rods 8.1, 8.2, 8.3 respectively. These rods are separate from one another and mounted in series in a governing casing 9 having, for each partial opening piston, an opening for the admission of the governing fluid, 9.1, 9.2, 9.3 respectively, and a lug piece 10.1, 10.2, 10.3, respectively for the end of the run in the direction of closing. The end-of-run lug pieces 10.1, 10.2, 10.3 are provided in the form of movable rings that rest on internal shoulders of the casing 9, 11.1, 11.2, 11.3, respectively. Of course, the shoulders 11.1, 11.2, 11.3 would be difficult to create in a casing made of a single part, and casing 9, therefore, is created in several parts joined together in a known manner (not illustrated). For example, the casing can be made by means of bolts that extend longitudinally in the wall of the casing and are screwed into the head of casing 12.

The valve further includes a common connecting rod 13, coaxial with rods 8.1, 8.2, 8.3 of the partial opening pistons and attached at one if its ends to the closing device. The valve also includes a maximum opening means associated with the common connecting rod 13. In the embodiment that is illustrated, the maximum opening means is combined with a means for closing the valve in the absence of governing fluid and includes a maximum opening piston 14 affixed to the common connecting rod 13. The maximum opening piston 14 is urged in the direction for closing the valve by a spring 15 coaxial with the common connecting rod 13 and having one of its ends abutting the piston 14 and its other abutting a lid 16 of the head of the casing 12. The lid 16 is connected to the casing portion having the internal shoulder 11.1 by means of small columns 17.

A maximum opening chamber 18 is provided in the head of casing 12 and it is connected with a face of the a maxumum opening piston 14 that is opposite the spring 15. The maximum opening chamber 18 has an opening for the feeding of governing fluid 19.

The casing head 12 includes means for adjusting the entire complex of movable parts relative to the valve body. These adjusting means have a screwnut 20, the internal thread of which cooperates with an external thread 21 located on the head of casing 12 and coaxially with the partial opening piston rods. The screwnut 20 is connected to the valve body by a tubular member 22 affixed to the valve body 1 by means of a clamp 23. The tubular member 22 also functions as a guide for the common connecting rod 13. The screwnut 20 is axially secured in position by means of a clip 24 that is received in a circular groove 22 and separated from the screwnut 20 by a washer 25.

Means are further provided to prevent casing 9 from rotating with the screwnut 20. The means includes a screw 26 attached perpendicularly to the casing head 12 and received between the teeth of a fork 57 which is connected to a bracket 28. The bracket 28 is attached to the tubular member 22 by means of a screw 29.

The screwnut 20 is rotated by governing means which include a first cone-shaped pinion 30 fixed on the screwnut 20, and a second cone-shaped pinion 31 connected to a remote control mechanism that includes a flexible cable 32 with a sheath 22 affixed to the support bracket 28.

The valve body 1 is connected to an intake duct 34 and to distribution duct 35 by clamps 36 and 37, respectively. The intake duct 34 is conneted to a constant level tank 38 equipped in a classical manner with a float 39 connected to a clack valve 40 by a system of rods 41.

Figure 2:
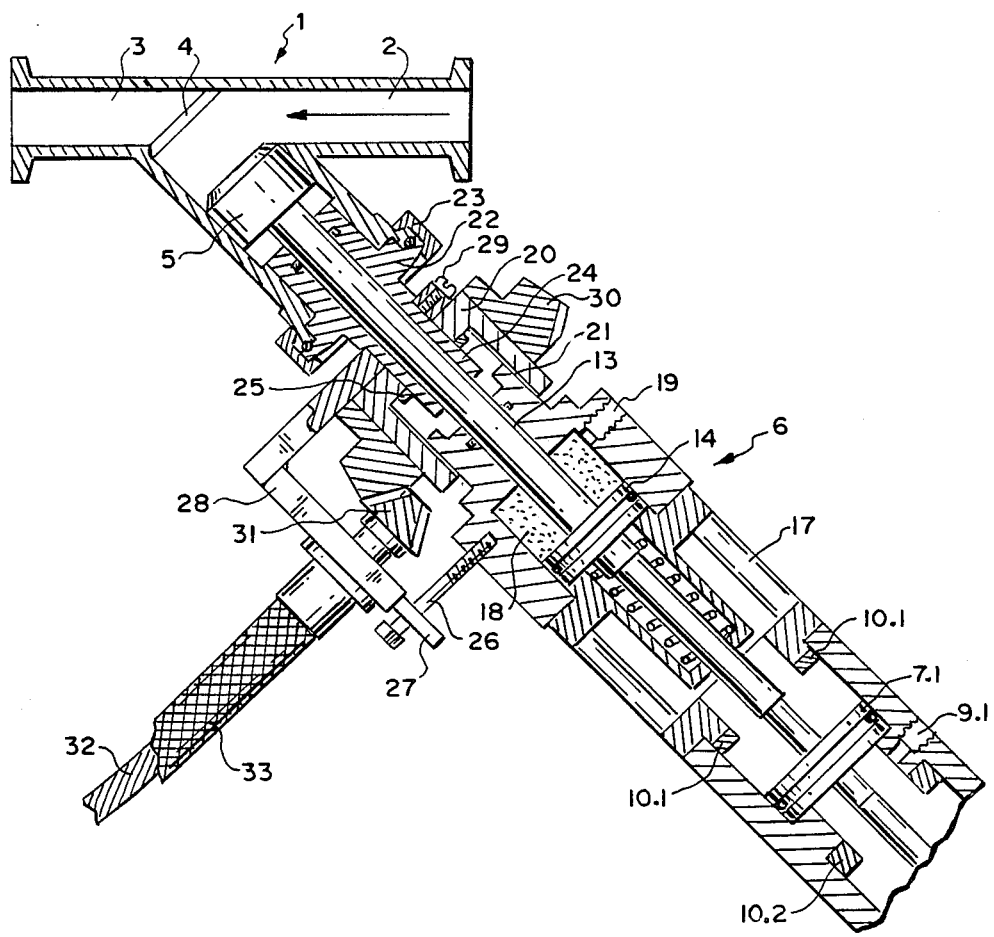
FIG. 2 is an enlarged cross-sectional view of the distribution valve according to the present invention.
Figure 3:
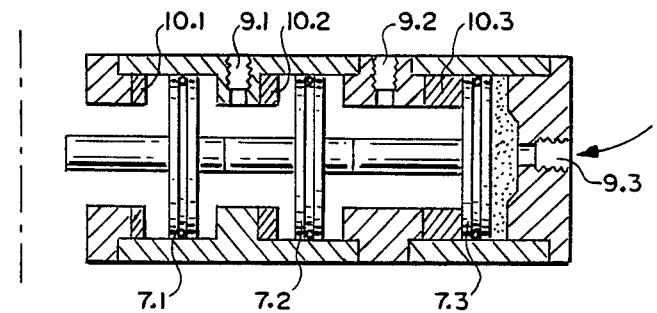
FIGS. 3, 4 and 5 are cross sectional views which illustrate the operation of the distribution valve according to the present invention.
Figure 4:
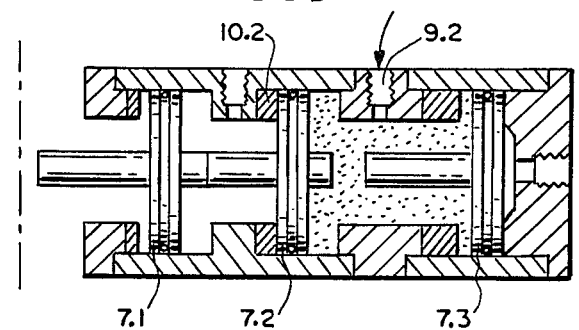

The device functions as follows: when no governing fluid is supplied to the distribution valve, the spring 15 pushes back the piston of maximum opening 14 which moves the common connecting rod 13, and consequently the closing device 5 towards the position of total closing. When governing fluid is supplied to the intake opening 19, the piston is pushed back against the the spring 15 and comes to rest against the lid 16, thus causing the maximum opening of the valve. It will be noted in FIGS. 1 and 2 that the maximum opening piston 14 has a smaller cross-sectional dimension than the pistons of partial openings 7.1, 7.2, 7.3. Consequently, when the same governing fluid is simultaneously let into the chamber 18 and the intake opening 9.3, the piston 7.3 is pushed back in the direction of closing and comes to rest against the end-of-run lug piece 10.3. The thickness of the end-of-run lug piece 10.3, therefore, determines the degree of opening of the valve. When the governing fluid is simultaneously let into than chamber 18 and the intake opening 9.2, the valve assumes an equilibrium position that is illustrated in FIG. 4. That is to say, the piston 7.3 is pushed back toward the end of casing 9 while the piston 7.2 is pushed back in the direction of closing and comes to rest against the end-of-run lug piece 10.2. Should be noted in this respect, that the run of pistons 7.1, 7.2, 7.3 increases from the partial opening piston 7.3, which is the farthest away from the common connecting rod 13. If the piston 7.3 had a longer run that the piston 7.2 during the movement of the piston 7.3, the piston 7.2 would come to rest against the lug piece 10.2 befor the piston 7.3 would cover its entire run.

Figure 5:
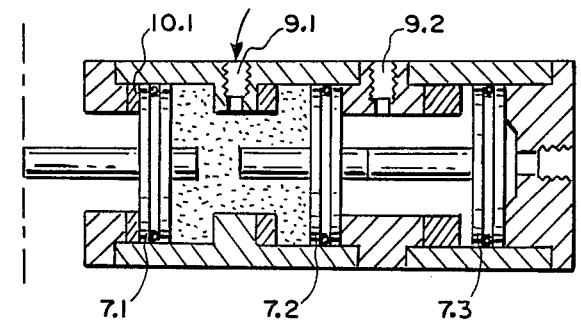

FIG. 5 illustrates the position of equilibrium assumed when the govening fluid is simultaneously let into the chamber 18 and the intake opening 9.1. The piston 7.1 then is resting against the end-of-run lug piece 10.1 and the valve is in its position of nominal partial opening.

When it is desired to very accurately regulate the entire complex of partial openings, the screwnut 20 is rotated by means of the cone-shaped pinions 30 and 31 and the entire casing 9 complex is moved in a direction parallel to its axis, thus causing the corresponding closing movement of device 5.

The the present invention is not limited to the embodiments that have been described above, and it is possible to vary its modes of practice as may be apparent to those skilled in the art. Specifically, it is possible to create a valve that does not include any closing device for closing in the absence of governing fluid. For example by placing a spring that acts on connecting rod 13 in the direction of opening of same, and by providing a stop valve on the admission duct 34. In the same manner, it is possible to replace the sliding closing device 5, which is illustrated, with a pivoting closing device. The commom connecting rod 13 is then connected by a set of rods to the pivoting shaft of the closing device.

We claim:

1. A distribution valve for the distribution of a liquid, comprising a valve body, a feeding duct in the valve body, a distribution duct, a seal between the feeding duct and the distribution duct, portions of the feeding duct extending in a plane that is the same as a plane defined by portions of the distribution duct and the seal extending in a plane that is located at an acute angle to a plane extending between the feeding duct and distribution duct, a closing device mounted in a movable manner at an acute angle to the feeding duct, facing the seal, means for regulating the closing device so as to position the closing device relative to the seal, the means for regulating the closing device comprising means movable in steps, connected to the closing device by a common connecting rod, and means for adjusting the entire complex of movable means as a unit relative to the valve body.

2. A distribution valve according to claim 1, wherein the means movable in steps is mounted in a governing casing associated with the valve body, and a screwnut is located in the governing casing connected to the valve body and rotatable relative to the latter, an external thread located on a part of the governing casing, the screwnut receiving the connecting rod coaxially attached to the governing casing, and means for preventing the governing casing from rotating with the screwnut are provided.

3. A distribution valve according to claim 2, further comprising means for regulating the rotation of the screwnut including a first cone-shaped pinion associated with the screwnut and a second cone-shaped pinion associated with a remote control mechanism.

4. A distribution valve according to claim 3, wherein the remote control mechanism includes a flexible cable.

5. A distribution valve according to claim 1, further comprising means for closing the valve in the absence of governing fluid.

6. A distribution valve according to claim 1, wherein the means for closing the valve in the absence of governing fluid includes a maximum opening piston associated with the common connecting rod, a spring for urging the maximum opening piston in the direction of closing of the valve, a maximum opening chamber attached to a face of the maximum opening piston opposite the action of the spring and an opening for the feeding of governing fluid into the maximum opening chamber.

7. A distribution valve according to claim 1, wherein the means movable in steps includes means for maximum opening associated with the common connecting rod, partial opening pistons attached to rods that are separated from one another and assembled in a series in a governing casing which has, for each partial opening piston, an intake opening for the regulation of fluid and lug piece for the end-of-run in the direction of closing, the run of each piston increasing from the partial opening piston that is farthest from the common connecting rod.

8. A distribution valve according to claim 7, wherein the end-of-run lug pieces of the partial openings pistons are movable.

9. A distribution valve according to claim 7 wherein the maximum opening piston has an effective section smaller than the partial opening pistons.

10. A distribution valve for the distribution of a liquid comprising:
   a valve body haivng located therein a feeding duct and a distribution duct, the feeding duct defining a channel for fluid flow lying in plane that is the same as a plane in which a channel defined by the distribution duct lies in;
   a seat located between the feeding duct and the distribution duct extending in a plane that is located at an acute angle to the planes defined by the distribution duct and the feeding duct;
   a closing device faces the seat and is mounted at an acute angle to the plane defined by the distribution duct and feeding duct for movement toward and away from the seat, means are provided causing the closing device to move toward and away from the seat, the means for causing the closing device to move including means movable in steps connected to the closing device by a connection rod; and
   means for adjusting as a unit the means movable in steps relative to the valve boby.

11. The distribution valve of claim 10 including means for closing the valve in the absence of a governing fluid.

12. The distribution valve of claim 10 wherein the means for closing the valve includes a spring for closing the valve in the absence of a governing fluid.

13. The distribution valve of claim 12 wherein the means for closing the valve includes a piston coupled to the spring.

14. The distribution valve of claim 13 wherein the means for closing includes a chamber that is so constructed and arranged that when it receives governing fluid, through an opening in the chamber, it limits the movement of the piston in a closing direction.

15. The distribution valve of claim 13 wherein the means movable in steps includes at least two pistons coupled to rods and located within chambers within a housing of the closing device.

16. An apparatus for feeding a liquid from a reservoir comprising:
   a distribution duct that defines a channel extending from the reservoir;
   a feeding duct that defines a channel in fluid communication with the channel of the distribution duct;
   a valve seat, located between the distribution duct and feeding duct, the channels defined by the distribution and feeding duct extending in the same plane at the valve seat, and the valve seat being located at an acute angle with respect to that plane; and
   a closing device, for regulating fluid flow from the distribution duct to the feeding duct, including a movable valve, movable in a direction that is at an acute angle to the flow of fluid from the distribution duct to the feeding duct, for mating with the valve seat, means coupled to the valve for urging the valve toward the valve seat, at least two pistons, located within chambers defined by a housing of the closing device, for regulating the extent of movement of the valve toward the valve seat, one of the piston having a smaller effective dimension than another piston, means for adjusting said at least two pistons contemporaneously relative to the valve body.

17. The apparatus of claim 16 wherein the chambers include means for allowing the chambers to receive a governing fluid.

18. The apparatus of claim 16 wherein the piston having the small effective dimension is coupled to a spring that urges the piston toward the valve seat.

19. The apparatus of claim 16 wherein a chamber in which the piston having the smaller effective size is located includes means for allowing a governing fluid to be fed therein, the governing fluid urging the piston in a direction away from the valve seat.

20. The apparatus of claim 19 wherein when the chamber having the piston having the smaller effective size is filled with a governing fluid, the closing device allows the greatest fluid flow from the distribution duct to the feeding duct.

* * * * *

UNITED STATES PATENT AND TRADEMARK OFFICE
CERTIFICATE OF CORRECTION

PATENT NO. : 4,869,458
DATED : September 26, 1989
INVENTOR(S) : Etienne Susini, et al It is certified that error appears in the above-identified patent and that said Letters Patent is hereby corrected as shown below:

In column 5, at line 60, delete "openings" and substitute --opening-- therefor.

In column 5, at line 67, delete "haivng" and substitute --having-- therefor.

In column 6, at line 1, before "plane" insert --a--.

In column 6, at line 17, delete "boby" and substitute --body-- therefor.

In column 6, at line 59, delete "piston" and substitute --pistons-- therefor.

In column 6, at line 67, delete "small" and substitute --smaller-- therefor.

Signed and Sealed this

Eleventh Day of September, 1990

Attest:

HARRY F. MANBECK, JR.

*Attesting Officer*      *Commissioner of Patents and Trademarks*